United States Patent

Galloway

[15] 3,635,533

[45] Jan. 18, 1972

[54] THRUST BEARING

[72] Inventor: Leslie C. Galloway, Burlington, Ontario, Canada

[73] Assignee: Canadian Westinghouse Company Limited, Hamilton, Ontario, Canada

[22] Filed: May 25, 1970

[21] Appl. No.: 40,165

[52] U.S. Cl. ..............................................308/9
[51] Int. Cl. .....................................F16c 17/16
[58] Field of Search......................308/9, 122, 170, 168, 160, 308/172

[56] References Cited

UNITED STATES PATENTS 3,189,389  6/1965  Heer.........................................308/9
3,540,783  11/1970  Cudnohufsky.........................308/122
3,193,334  7/1965  Porath......................................308/9
3,493,273  2/1970  Greenberg................................308/9

Primary Examiner—Edgar W. Geoghegan
Assistant Examiner—Frank Susko
Attorney—R. H. Fox

[57] ABSTRACT

The invention relates to axial thrust bearings for rotating shafts of electrical machines wherein large end thrusts are produced. A source of hydraulic pressure is provided, coupled with a pair of hydraulic pads mounted on each side of a flange on the shaft to apply counter forces maintaining the shaft in a neutral position.

7 Claims, 3 Drawing Figures

3,635,533

THRUST BEARING

BACKGROUND OF THE INVENTION

This invention relates to axial thrust bearing for rotating shafts and has particular application to horizontal shafts for electrical machinery.

In some machinery driven by large rotating electrical machines large end thrusts are produced. When such machinery is directly coupled to the electrical machine there is a tendency for the end thrusts to be applied to the electrical machine. Such machines are normally provided with end thrust bearings, for example, shoulders have been produced on the shaft which engaged shoulders on the journal bearings. These are suitable for small forces but when the forces become substantial, the design of a shoulder becomes quite impractical. Generally speaking, the loading must not exceed 25 pounds per square inch on such a surface. Another solution to the problem has been the tilting pad thrust bearing and while these bearings may be designed to carry greater loads, they become quite expensive and impractical, for most applications.

A further alternative is a device such as a dashpot but this too becomes large and expensive when the forces become substantial. In addition, while the dashpot provides damping it does not provide an axial locating function or limits.

Prior solutions, it will be seen, therefore had various drawbacks but basically they all suffered from one common fault, their force versus displacement curve was unsuitable. In the case of ordinary bearings, if the bearings were arranged to provide substantial axial movement then the force versus displacement curve became almost discontinuous, the arrangement provided almost no centering force and permitted the shaft to float freely back and forth between its limits. In the case of a dashpot the force versus displacement curve, over its operational limit, would be a straight line of zero slope, assuming a constant velocity displacement. Here again it will be evident that there is no centering force although the tendency for the shaft to float back and forth would be less.

SUMMARY OF THE INVENTION

In accordance with my invention, it is proposed to overcome the problems of the previous systems by making use of a source of hydraulic pressure and a pair of hydraulic pads mounted on each side of a flange on the shaft to apply counter forces to maintain the shaft in a neutral position.

BRIEF DESCRIPTION OF THE DRAWINGS

A clearer understanding of my invention may be had from a consideration of the following description and drawings of a preferred embodiment in which.

DESCRIPTION OF THE PREFERRED EMBODIMENT

Figure 1:
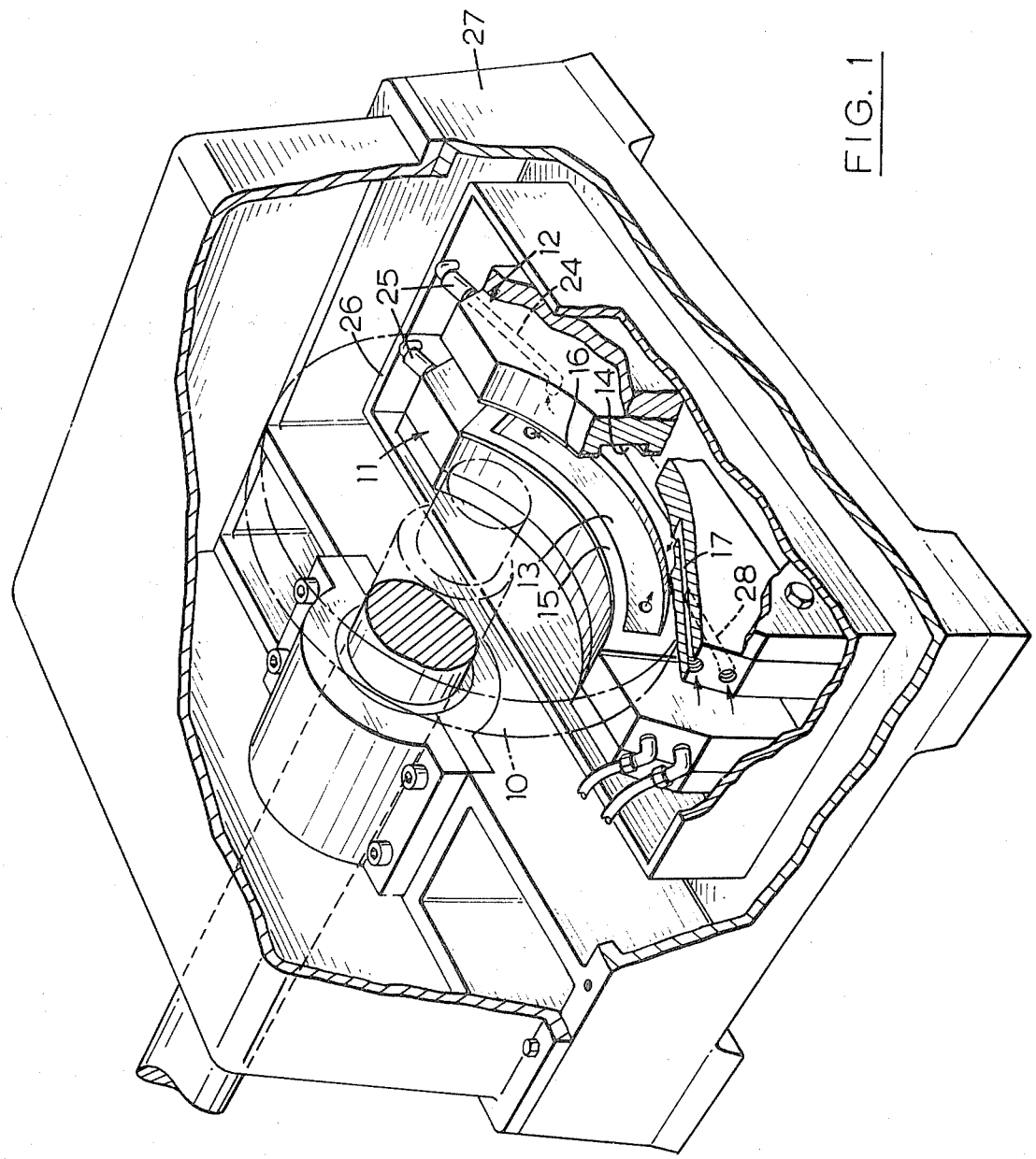
FIG. 1 is a perspective of an end of a shaft including a bearing in accordance with my invention.

Considering first FIG. 1, it will be seen that the shaft is supported in a journal bearing or in some other suitable manner, and extends beyond such bearing and has affixed to it a disc 10. A pair of pads 11 and 12 are mounted in the bearing enclosure and fixedly attached to its base which, while not shown, is mounted firmly on the frame of the machine. Within the pads 11 and 12 are recesses 13 and 14 which are completely surrounded by protruding surfaces 15 and 16. These protruding surfaces are faced with a suitable bearing surface material such as babbitt. Conduits, such as conduit 17, communicate with the recesses in order that oil under pressure may be applied to the recess. Further conduits, such as conduit 24, are terminated with overpressure relief valves such as valve 25. The whole assembly including both pads and the enclosed portion of the flange, is surrounded by wall 26 which functions as a weir to maintain the oil level at least as high as the top of this wall which is higher than any point on the recess. Oil running over the wall 26 is collected in the general reservoir 27 and returned to the oil system. Oil may also be slung around the chamber in general and run down the top and sides back into the general reservoir 27.

Figure 2:
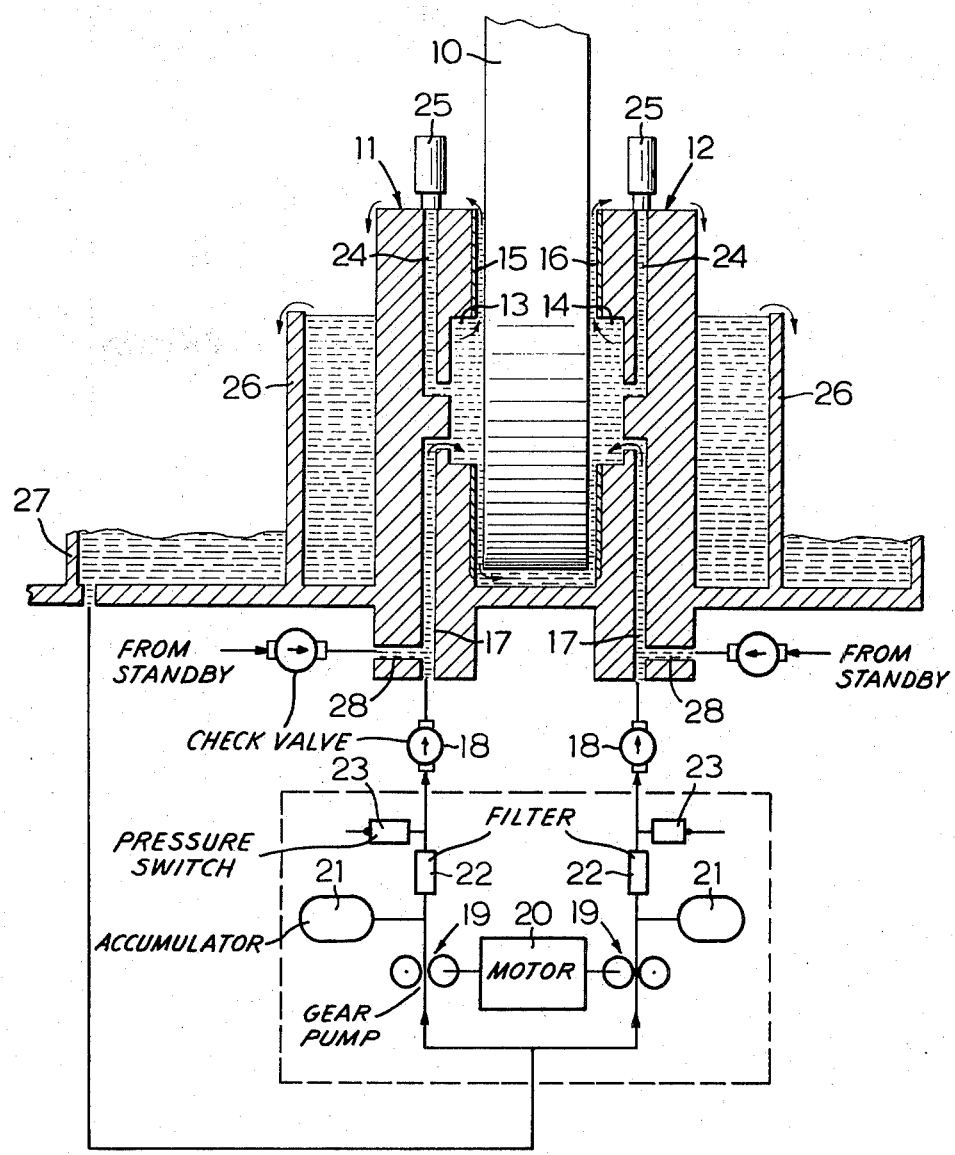
FIG. 2 is a view in section of the bearing together with its associated circuitry.

Turning now to FIG. 2, it will be seen that the recesses 13 and 14 are coupled through conduits 17 and check valves 18 to the oil pressure system. The oil pressure system consists of gear pumps 19 driven by a motor 20, feeding oil under pressure to an accumulator 21 and through filters 22 to the check valves. A pressure switch 23 is actuated by the oil pressure. A rotating shaft subject to substantial axial loading is stabilized by the application of hydraulic forces to a flange mounted on the shaft. The forces are made to depend upon the displacement.

OPERATION

In operation, oil is pumped into the recesses by the positive displacement pump; each recess having its own pump and while each pump is driven by the common motor, they are otherwise independent.

In an unloaded condition, the flange 10 will stand equally spaced from both pads. If any force tends to move the flange in one direction or another, it changes the pressure in the recesses. For example, if flange 10 tends to move toward the left, the space between the flange and the surface 15 decreases thus inhibiting the flow of oil out of the recess and causing an increase in pressure. At the same time, the space between surface 16 and the flange increases and the pressure in recess 14 decreases. This differential pressure tends to restore the flange to its original position and prevent it from actually engaging the surface of the pad.

The overpressure relief valve, which may be set at a very high pressure, for example 2,000 p.s.i., prevents shocks to the mechanical system driving the pressure up above the predetermined limit which might be destructive to the oil supply system. In a similar way the check valve 18 prevents back pressures from being reflected into the oil supply system.

The weir formed by wall 26 ensures that the recesses remain full of oil under all circumstances even when the system is stationary thus limiting the probability of inadvertent contact between flange and the metal surfaces of the pads and also permitting substantial oil flow when the flange is in its intermediate position without the pads being uncovered. This system may also provide suitable protective devices such as the pressure switch 23 which may be arranged to operate alarms, or prevent operation of the machine in the absence of suitable oil pressure. Alternatively the switch may be arranged to provide for operation of a standby system which is shown connected in an alternate conduit 28. The standby pressure system corresponds exactly with the standard pressure system illustrated and comprises a motor and pump and auxiliaries.

Figure 3:
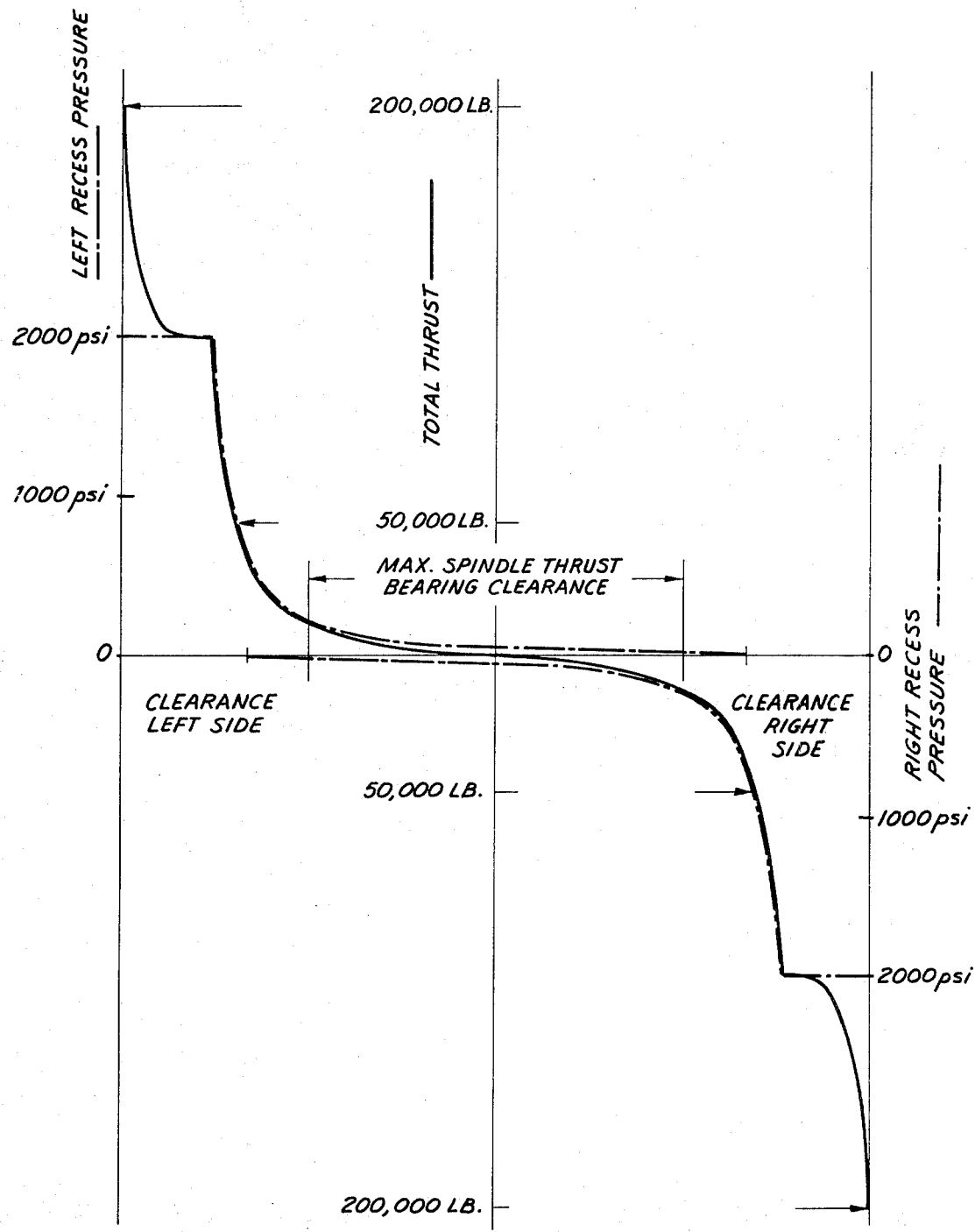
FIG. 3 is a graph of pressure versus displacement characteristic of the mode of operation of such a bearing.

As will be seen in FIG. 3, the pressure on one side or the other flange, as measured in pounds per square inch in a vertical direction on the graph, varies depending upon the displacement of the flange from its central neutral position. The graph illustrates that over the whole of the force versus displacement curve, except when the flange is in a centered position, there is a restoring force tending to center the flange and this force is proportional to displacement. The numbers indicated on the graph, of course, will vary depending on the design of the system but in the case shown, it will be evident that there is a large permissable movement before pressures become substantial and the flange may move 20 thousandths of an inch to one side before reaching a pressure of 1,000 p.s.i. in the system. At this point the total side thrust absorbed may be in the neighborhood of 50,000 lbs.

The location of the check valve and the pressure relief valves are such that shock loading on the thrust bearing which gives rise to shock pressure waves in the oil is confined to the oil actually within the recess in the pad or in the conduits drilled in the pad thus ensuring that the system is capable of withstanding the high pressures generated by shock loading.

The embodiments of the invention in which an exclusive property or privilege is claimed are defined as follows:

1. An end thrust bearing having a horizontal shaft mounted for rotation on a frame, said thrust bearing comprising a flange fixed on said shaft having its opposite faces substantially smooth and parallel, a pair of pads fixed on said frame on opposite sides of and facing said flange, a recess in the face of each of said pads, a separate source of lubricating fluid under pressure connected to said recesses through a check valve, an enclosure surrounding said pads, the lowest point on the upper edges of said enclosure being higher than the highest point in the said recess, an outlet duct connected to each of said recesses including overpressure relief valves.

2. An end thrust bearing having a horizontal shaft mounted for rotation in a frame, said thrust bearing comprising at least one flange mounted on said shaft with its opposite faces lying in planes perpendicular to the axis of said shaft, a pair of pads mounted on said frame on opposite sides of and facing said flange, recesses in the face of each of said pads, a separate constant flow source arranged to provide lubricating fluid under pressure to each of said recesses, said pads being so designed and arranged as to permit a substantial axial movement of said shaft and simultaneously together with the flow of lubricating fluid prevent contact between the flange and pad even in the presence of substantial axial overload conditions.

3. An end thrust bearing as claimed in claim 1 wherein a lubricating fluid is supplied to said recesses through ducts formed in the pad and said relief valve is directly connected to said outlet duct without any intervening conduit.

4. An end thrust bearing as claimed in claim 1 wherein said outlet duct is formed directly in said pad and said pressure relief valve is directly connected in to said outlet duct.

5. An end thrust bearing as claimed in claim 1 wherein said source of lubricating fluid under pressure consists of a pair of positive displacement pumps, one connected to each of said recesses.

6. An end thrust bearing for a horizontal shaft as claimed in claim 1 wherein said source of lubricating fluid includes an underpressure detector contact arranged to provide a signal indicating the absence of fluid pressure.

7. An end thrust bearing having a rotatable shaft mounted for rotation in a frame, said thrust bearing comprising a flange fixed on said shaft having its opposite faces substantially smooth and parallel, a pair of pads fixed on said frame on opposite sides of and facing said flange, a recess in the face of each pad, a separate source of lubricating fluid under pressure connected to each recess through a check valve, an enclosure for said bearing, an outlet duct connected to each recess including overpressure relief valves.

* * * * *